United States Patent [19]

Bedos et al.

[11] Patent Number: 4,609,916
[45] Date of Patent: Sep. 2, 1986

[54] METHOD AND DEVICE FOR DISPLAYING PRIMARY COLORS UTILIZING INPUT VALUES REPRESENTATIVE OF BRIGHTNESS, SATURATION AND HUE OF A COLORED BACKGROUND

[75] Inventors: Thierry Bedos, Levallois Perret; Roland Clerissi, Meulan; Jacques Vallee, Saint Brice Sous Foret; Kiet Nguyen Xuan, Mery sur Oise, all of France

[73] Assignee: Thomson CSF, Paris, France

[21] Appl. No.: 605,911

[22] Filed: May 1, 1984

[30] Foreign Application Priority Data

May 10, 1983 [FR] France .................................. 83 07797

[51] Int. Cl.⁴ ............................................... G09G 1/28
[52] U.S. Cl. ....................................... 340/703; 358/22
[58] Field of Search .................. 340/703, 725; 358/22, 358/27, 28, 82

[56] References Cited

U.S. PATENT DOCUMENTS 4,183,046 1/1980 Dalke et al. ......................... 340/703
4,329,710 5/1982 Taylor ..................................... 358/22
4,379,292 4/1983 Minato et al. ....................... 340/703

FOREIGN PATENT DOCUMENTS 2544596 4/1977 Fed. Rep. of Germany .
0031031 2/1982 Japan .................................... 340/701

OTHER PUBLICATIONS

Buchanan, "Digital Image Processing: Can Intensity, Hue, and Saturation Replace Red, Green, and Blue?", Electro-Optical Systems Design, pp. 29–36, Mar. 1980.
Mignot et al., "Systeme d'Incrustation par Selection Dans l'Espace des Couleurs", L'Onde Electrique, vol. 53, Fasc. 9, pp. 360–363, Oct. 1973.

Primary Examiner—John W. Shepperd
Attorney, Agent, or Firm—Cushman, Darby & Cushman

[57] ABSTRACT

The method consists of displaying, as colored background control variables, the brightness Y, the saturation S and the hue T which are desired and of deducing therefrom the coefficients of the primary colors red, green and blue by means of calculating and switching circuits. The function of the switching circuits is to choose, as a function of the hue signal, those of the signal supplied by the calculating circuits which will constitute the coefficients of the primary colors.

3 Claims, 8 Drawing Figures

METHOD AND DEVICE FOR DISPLAYING PRIMARY COLORS UTILIZING INPUT VALUES REPRESENTATIVE OF BRIGHTNESS, SATURATION AND HUE OF A COLORED BACKGROUND

The present invention relates to the control of a colored background in a television picture.

BACKGROUND OF THE INVENTION

For the purposes of controlling a colored background (rectangle, square, patch, etc), it is merely necessary to control three variables, e.g. the red (R), the green (G) and the blue (B). However, the three variables of this example correspond to notions which are only difficultly perceptible by the human eye. Thus, in certain known means, a brightness control is brought about by a potentiometer, while there is a double control by means of a "joy-stick", which generates a voltage "square" by controlling two potentiometers. This "square" is likened to the color triangle or chromaticity diagram and one point of the triangle is associated with each position of the joy-stick. However, in this case, the sensitivity of the hue or tint control varies as a function of the zones, because of the nature of the triangle-square transformation.

Moreover, in the known constructions, the possibilities of modulating the hue and saturation are limited, because in particular it is not possible to act on the hue without modifying the saturation and vice versa.

SUMMARY OF THE INVENTION

The object of the invention is to obviate the aforementioned disadvantages. This is brought about by taking as the control variables: the brightness, hue and saturation, and by determining the chromaticity or color coefficients on the basis of these three variables with the aid of a hypothetically given representation of the geometric locus of the coefficients for a given brightness, when the hue and saturation vary.

According to the present invention, there is provided a method for controlling a colored background which consists of displaying, as control variables, the brightness Y, saturation S and hue T, and determining the coefficients of the primary colors as a function of these three variables.

According to the present invention, there is further provided a device for controlling a colored background comprising means for displaying the saturation, the brightness and the hue in order to supply a signal S representing the saturation, a signal Y representing the brightness and a double signal T representing the hue and which is formed from two signals, namely a signal $T_3$ representing the most significant values of the hue and with which, as a function of its value, is associated one value from among six values varying in increasing order from the first to the sixth, and a signal T' representing the least significant values of the hue and varying from the value 0 to the value $2 \times dT$, dT being a predetermined constant value; calculating means coupled with the display means for supplying signals $$k1 = Y - SxY + \frac{TxSxY}{dT}, k2 = Y - SxY \text{ and}$$

-continued
$$k3 = Y + SxY - \frac{TxSxY}{dT};$$

switching means coupled with the display means for receiving the signals Y and $T_3$ and to the calculating means to receive the signals k1, k2, k3, said switching means serving to supply as signals representing the respective coefficients of the three primary colors of the colored background:

for the first of the six values associated with $T_3$: Y, k1, k2 for the second of the six values associated with $T_3$: k3, Y, k2 for the third of the six values associated with $T_3$: k2, Y, k1 for the fourth of the six values associated with $T_3$: k2, k3, Y for the fifth of the six values associated with $T_3$: k1, k2, Y for the sixth of the six values associated with $T_3$: Y, k2, k3.

BRIEF DESCRIPTION OF THE DRAWINGS

The invention is described in greater detail hereinafter relative to non-limitative embodiments and with reference to the attached drawings, which show.

The corresponding elements are designated by the same references throughout the drawings.

MORE DETAILED DESCRIPTION OF THE INVENTION

Figure 1:
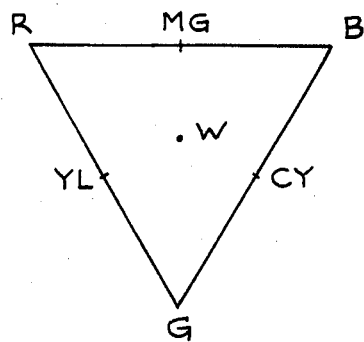
FIG. 1 a conventional color triangle.

FIG. 1 shows the conventional color triangle with white W, red R, blue B, green G, magenta MG, cyan CY and yellow YL points.

Figure 2:
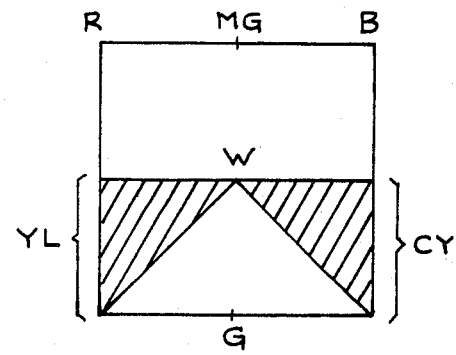
FIG. 2 a square to be compared with the triangle of FIG. 1.

For the purposes of controlling a colored background, it is known (THOMSON-CSF TTV 5600 mixer) to choose the brightness and determine a point in the color triangle by means of a "joy-stick", which controls two potentiometers whereof the displacements of the sliders take place in two perpendicular directions. As the values of the voltages supplied by the two potentiometers can be associated with all the points of a square (FIG. 2) and not with all the points of a triangle in order to liken the square to the colored triangle, in the aforementioned mixer the points of the hatched surfaces of the square of FIG. 2 are considered as yellow points (hatched left-hand surface) or cyan points (hatched right-hand surface). The hue is constant in these hatched surfaces. When a colored background control is performed on the basis of this principle, it is difficult, by modulating the voltages supplied by the control potentiometers, to modulate the hue and this alone, or the saturation and this alone.

Figure 3:
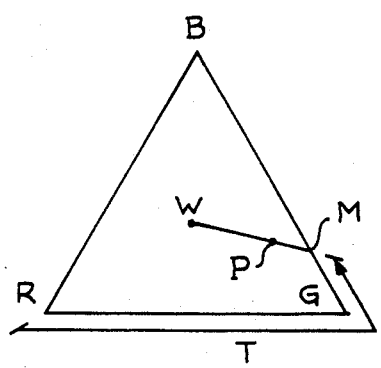
FIGS. 3 to 5 geometrical figures relative to the invention.

FIG. 3 shows a triangle R.G.B, which differs from the conventional color triangle (FIG. 1) due to the results which it gives for the coefficients of the primary colors as a function of a point P located in the triangle and corresponding to a given hue value and a given saturation value. The determination of these color coefficients, on the basis of a point in the triangle, involves the brightness Y in a manner which will be explained with reference to FIG. 4.

FIG. 3 shows a point M, such that the length R.G.M corresponds to the control at a given time of hue T. At this same time, the position of point P is determined by the control of the saturation $$S = \frac{W.P}{W.M}.$$

Figure 4:
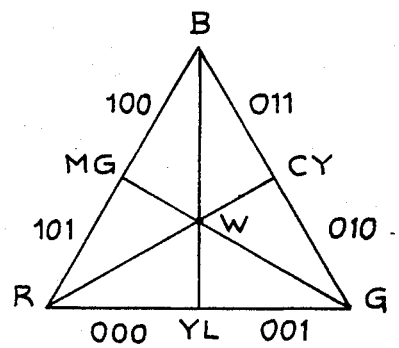

FIG. 4 shows how the value N.P of the red coefficient is defined when the position of point P and the value Y of the saturation are known. To this coefficient is given a value equal to the value of the brightness Y, where the considered color predominates, i.e. in such a way that for a point P in zone R.MG.W.YL (cf FIG. 4), the red coefficient is considered equal to Y. For a P outside the zone where the red predominates, this coefficient is defined in such a way as to have a linear variation between the limit MG.W.YL (cf FIG. 4) of the zone in which it is equal to Y and the limit B.G (cf FIG. 4) where it is equal to 0, i.e. on the other primary colors.

Figure 5:
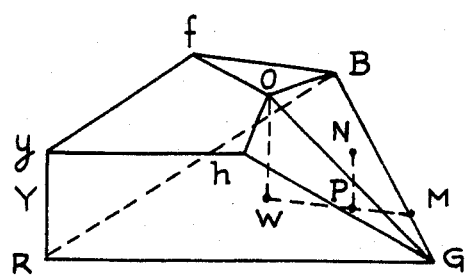

FIG. 5 shows the triangle R.G.B of FIG. 4 above which is shown a geometrical figure o.h.y.f.B.G.h which is all the points N, whose projection P on triangle R.G.B is such that N.P. has a length corresponding to the red coefficient, as defined in the previous paragraph.

The coefficients of the other primary colours (green and blue) are obtained by rotating by 120° and then again by 120° the geometrical figure formed above triangle R.G.B but while leaving the triangle fixed.

In the practical realization described hereinafter, the hue T is indicated on triangle R.G.B in the manner of FIG. 3: origin=point R, displacement direction=counterclockwise direction. There is finally coding of the hue by means of 10 bits, whereof the three most significant bits indicate the half-side from among the six half-sides of the triangle, such as G. CY, on which is located the point representing the hue. The value of these three most significant bits is plotted in FIG. 4 alongside the half-sides to which it corresponds: 000 for the half-side R.YL, 001 for the half-side YL.G, 010 for the half-side G,CY, etc.

The seven other hue bits correspond to an identification of the hue relative to a scale of 128 points regularly distributed over each half-side, so that the hue can vary from the value 0000000000 to the value 1011111111.

The brightness Y and the saturation are coded by means of eight bits in the described example.

The following calculation, based on FIGS. 4 and 5, gives the red coefficient for the different regions of the triangle in which point P can be located:

region R.W.G (2 most significant bits of the tint=00)
(a) zone R.W.YL (surface y0h of FIG. 5)—the value cut down to eight least significant bits of hue T is T', so that $0 \leq T' < 128$ and in this case the red coefficient is: $CLR(R) = Y$ (cf FIG. 5)
(b) zone YL.W.G associated with the surface G.h.o (FIG. 5), in which $128 \leq T' < 256$—for $S=1$ (segment hG of FIG. 5)

$$CLR(R) = Y\left(1 - \frac{TdT}{dT}\right) = 2 \times Y - \frac{T \times Y}{dT}$$

with dT=constant=128=maximum hue variation in the zone—for $0 \leq S \leq 1$ (S=0 at point 0 of FIG. 5)

$$CLR(R) = Y + \left(2 \times Y - \frac{T \times Y}{dT} - Y\right) S =$$

$$Y + S \times Y - \frac{T \times S \times Y}{dT}$$

region G.W.B (2 most significant bits of the hue=01) associated with surface G.O.B (FIG. 5) as the red coefficient is not dependent on T, it is only a function of Y and S $$CLR(R) = Y - SY$$

with at point 0 $CLR(R) = Y$; and on the line G.B $CLR(R) = 0$ region B.W.R (2 most significant bits of the hue=10)
(a) zone B.W.MG associated with the surface B.O.f (FIG. 5)—in this zone the value T' of the hue cut down to 8 least significant bits is such that $0 \leq T' \leq 129$ $$CLR(R) = Y - SxY + \frac{TxSxY}{dT}$$

in which dT has the value indicated hereinbefore
(b) zone MG.W.R associated with the surface f.O.y (FIG. 5), where $128 \leq T' < 256$ and $CLR(R) = Y$.

The green and blue coefficients are obtained by 120° and 240° rotation about the axis O.W of the surface y.h.G.B.f, while leaving triangle R.G.B (FIG. 5) fixed. Thus, the green and blue coefficients respectively correspond to the red coefficient of the preceding region and the following region (region has in this case the meaning given to it in the preceding paragraph).

By designating as $T_3$ the three most significant bits of the hue T making it possible (FIG. 4) to define which of the six zones, such as G.W.CY is that in which the control takes place, the color coefficients are consequently written:

for $T_3 = 000$ (zone R.W.YL, FIG. 4)

$$CLR(R) = Y$$

$$CLR(G) = Y - SxY + \frac{TxSxY}{dT}$$

$$CLR(B) = Y - S \times Y$$

for $T_3 = 001$ $$CLR(R) = Y + SxY - \frac{TxSxY}{dT}$$

$$CLR(G) = Y$$

$$CLR(B) = Y - S \times Y$$

for $T_3 = 010$ $$CLR(R) = Y - S \times Y$$

$$CLR(G) = Y$$

$$CLR(B) = Y - SxY + \frac{TxSxY}{dT}$$

for T$_3$=011

$$CLR(R) = Y - S \times Y$$

$$CLR(G) = Y + SxY - \frac{TxSxY}{dT}$$

$$CLR(B) = Y$$

for T$_3$=100

$$CLR(R) = Y - SxY + \frac{TxSxY}{dT}$$

$$CLR(G) = Y - S \times Y$$

$$CLR(B) = Y$$

for T$_3$=101

$$CLR(R) = Y$$

$$CLR(G) = Y - S \times Y$$

$$CLR(B) = y + SxY - \frac{TxSxY}{dT}$$

Figure 6:
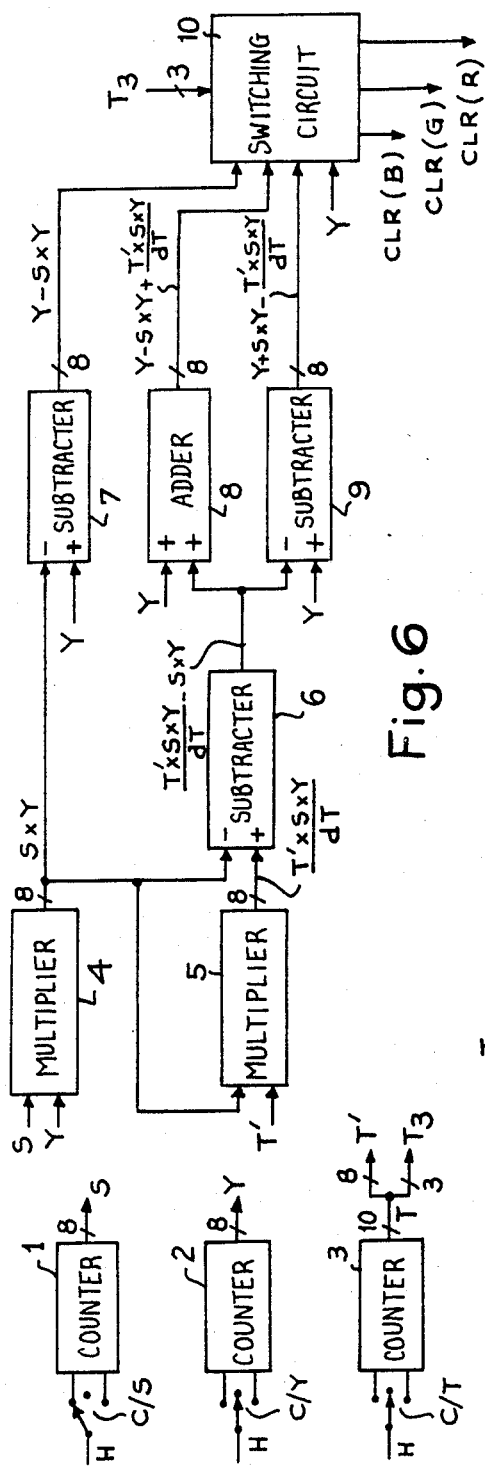
FIG. 6 a circuit diagram of a control device according to the invention.

FIG. 6 provides an embodiment of a device for controlling a colored background in a television picture. The device is described from the manual control of the variables S (saturation), Y (brightness) and T (hue) until the coefficients CLR(R), CLR(G) and CLR(B) are obtained.

In the present embodiment, the saturation, brightness and hue controls are clock pulses H transmitted on three ring counters 1, 2 and 3, respectively across three switches C/S, C/Y, C/T. The switches are three-position switches, whose common terminal receives the clock signal, whereof the center terminal is not connected and whereof the two other terminals are respectively connected to the add and subtract inputs of the ring counters.

Counters 1 and 2 count from 0 to 255 and supply, at their 8 outputs, respectively signals S and Y representing their state. Counter 3 counts from 0 to 635 and supplies, on its ten outputs, the signal T representing its state. The three most significant bits T$_3$ and the eight least significant bits T' of the hue signal are indicated at the output of counter 3.

A multiplier 4 receives signals S and Y and supplies a binary signal S×Y equal to the product of S by Y from which the eight least significant bits have been cut off. Another multiplier 5 forms the product of S×Y by T' and gives a binary signal (T'×S×Y)/(dT) equal to the product of S×Y by T', from which the eight least significant bits have been cut off.

As a function of the thus obtained binary signals, a first subtracter 6 carries out the subtraction (T'×S×Y)/(dT)−S×Y, a second subtracter 7 carries out the subtraction Y−S×Y, whilst an adder 8 performs the addition $$Y + \left( \frac{T \times S \times Y}{dT} - S \times Y \right) =$$

$$Y - S \times Y + \frac{T \times S \times Y}{dT}$$

and a third subtracter performs the subtraction $$Y - \left( \frac{T \times S \times Y}{dT} - S \times Y \right) =$$

$$Y + S \times Y - \frac{T \times S \times Y}{dT}.$$

The output signals of circuits 7, 8 and 9, as well as the brightness signal Y are transmitted to a switching circuit 10, which supplies the three primary color coefficients CLR(B), CLR(G), CLR(R).

Figure 7:
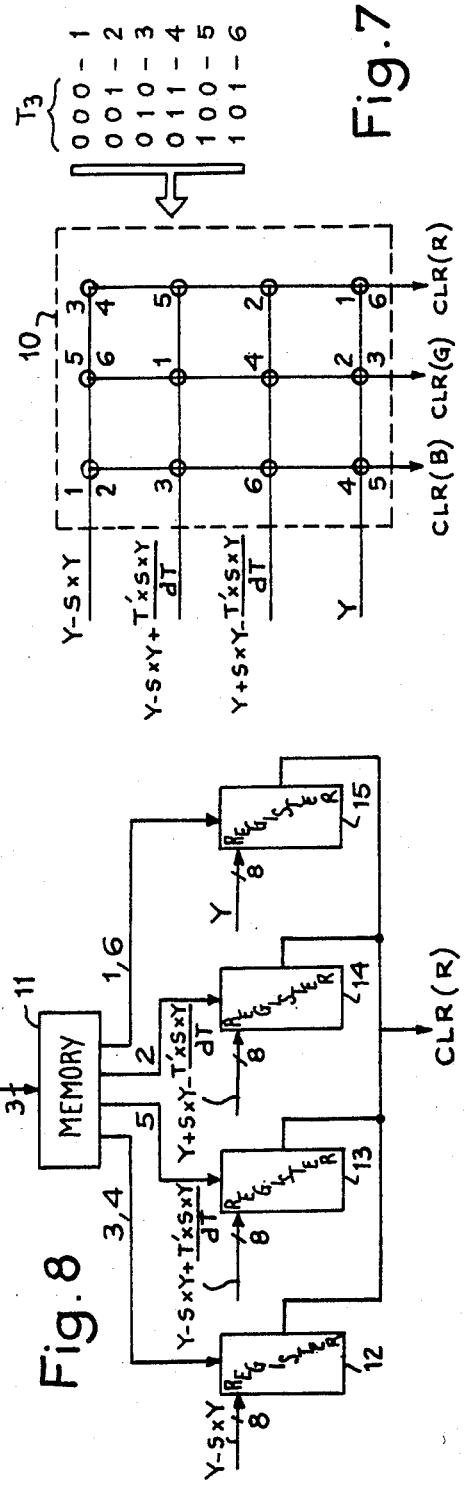
FIGS. 7 and 8 diagrams for explaining the operation of one of the circuits of FIG. 6.

FIG. 7 is a diagrammatic representation of the switching grid formed by the switching circuit 10. To the side of the switching grid is provided a table making a decimal digit between 1 and 6 correspond with the six values which can be assumed by T$_3$ (three most significant bits of the hue). This decimal digit is placed on the grid at the intersections where contact must be established, according to the value of T$_3$, in order to respectively connect three of the four inputs of switching circuit 10 to its three outputs. This grid has been established on the basis of three color coefficients, whose values as a function of T$_3$ have been given hereinbefore.

Figure 8:
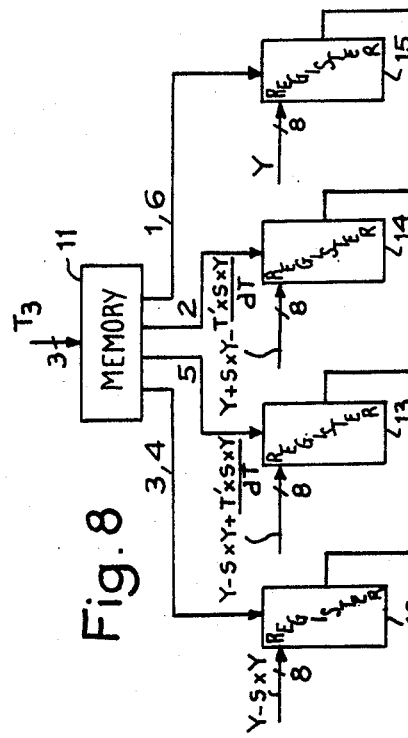

FIG. 8 is an embodiment of that part of the switching circuit 10 of FIGS. 6 and 7 used for obtaining the red coefficient CLR(R). The signal T$_3$ is applied to the input of a memory 11 (PROM,82HS147 of SIGNETICS) programmed to supply a logic level 1 signal on all its outputs except on its first output (signal 0) for T$_3$=010 or T$_3$=011 (marks 3,4 on the output conductor),
on its second output for T$_3$=100 (mark 5 on the conductor),
on its third output for T$_3$=000 (mark 2 on the conductor),
on its fourth output for T$_3$=000 or T$_3$=101 (marks 1,6 on the conductor).

The four outputs of memory 11 are respectively connected to the validation inputs of four registers, each having eight type "D" flip-flops (in the present case TEXAS register 374). These registers respectively receive, on their eight signal inputs, the signals Y−S×Y, $$Y - SxY + \frac{TxSxY}{dT}, Y + SxY - \frac{TxSxY}{dT}$$

and Y and their outputs are joined to supply the red coefficient in binary form.

It should be noted that in the colored background control device of FIG. 6, the brightness signal Y is defined by the value of the output signal of counter 2, which is the value displayed on counter 2 by means of switch C/Y. The effective value of the brightness, the coefficients CLR(R), CLR(G), CLR(B) being given, is:

effective
brightness=0.30CLR(R)+0.59CLR(G)+0.11CLR(B).

It is also pointed out that in FIGS. 6 and 7, the precise synchronization elements which form part of the prior art are not shown in order to make the drawings clearer and the description thereof simpler.

The present invention is not limited to the embodiment described, thus e.g. the number of bits of T' could be reduced to 1. The invention also applies to a construction using analog circuits, counters 1, 2 and 3 can be replaced by potentiometer-controled voltage sources, the control buttons of the potentiometer replacing the switches such as C/S. In this case, it is of interest, for simplification purposes, to control the hue signal T by means of a potentiometer associated with a six-position counter (1,2,3,4,5,6) which, modulo 6, adds or subtracts the half-rotations of the potentiometer slider, as a function of whether the potentiometer control button is turned in one or other direction. The signal $T_3$ is then given by the counter and the signal T' by the potentiometer-controlled voltage source. The constant dT is equal to half the peak excursion of the voltage at the output of the voltage source, when the control potentiometer performs a complete turn.

We claim:

1. A method for displaying primary colors of a colored background utilizing, as control variables, values Y, S and T corresponding respectively to brightness, saturation and hue values and determining the coefficients R, G, B of the primary colors of the colored background as a function of these three variables, said method consisting of defining, on the basis of the peak excursions $6 \times dT$ of the hue, six equal intervals of width dT, and three equal regions of respective origin $T=0$, $T=2 \times dT$ and $T=4 \times dT$ defining the hue value displayed by the interval in which said displayed value is located and by the difference T' between the displayed value and the value of the origin of the particular region in which it is located and taking as respective coefficients of the three primary colors red, green and blue:

in the interval $T=0$ $T=dT$:

$$Y, Y - S \times Y \frac{T \times S \times Y}{dT} = k1,$$

$Y - S \times Y = k2,$ in the interval $T=dT$ $T=2dT$:

$$Y + S \times Y - \frac{T \times S \times Y}{dT} = k3, Y, k2,$$

in the interval $T=2dT$ $T=3dT$: k2, Y, k1,
in the interval $T=3dT$ $T=4dT$: k2, k3, Y,
in the interval $T=4dT$ $T=5dT$: k1, k2, Y,
in the interval $T=5dT$ $T=6dT$: Y, k2, k3.

2. A device for displaying R, G, B primary colors of a colored background comprising means for displaying input values S, Y and T representing respectively saturation, brightness and hue values, T being formed from two values, namely a value $T_3$ representing the most significant values of the hue and with which, as a function of its value, is associated one value from among six values varying in increasing order from the first to the sixth, and a value T' representing the least significant values of the hue and varying from the value 0 to the value $2 \times dT$ (dT being a predetermined constant value); calculating means coupled with the display means for supplying signals $$K1 = Y - SxY + \frac{TxSxY}{dT}, k2 = Y - SxY \text{ and}$$

$$k3 = Y + SxY - \frac{TxSxY}{dT};$$

switching means coupled with the display means for receiving the signals Y and $T_3$ and to the calculating means to receive the signals k1, k2, k3, said switching means serving to supply as signals representing the respective coefficients of the three primary colors of the colored background:

for the first of the six values associated with $T_3$: Y, k1, k2 for the second of the six values associated with $T_3$: k3, Y, k2 for the third of the six values associated with $T_3$: k2, Y, K1 for the fourth of the six values associated with $T_3$: k2, k3, Y for the fifth of the six values associated with $T_3$: k1, k2, Y for the sixth of the six values associated with $T_3$: Y, k2, k3.

3. A device according to claim 2, which is in digital form, wherein the hue display means supply a hue signal of at least four bits, whereof the three most significant bits form the signal $T_3$ and whereof the bits other than the three most significant bits form the signal T'.

* * * * *